United States Patent [19]
Atherton et al.

[11] 3,993,539
[45] Nov. 23, 1976

[54] METHOD AND DEVICE FOR MEASURING FLUID FLOW

[75] Inventors: Richard Atherton, Pittsburgh; Phillip S. Marinkovich, Bethel Park; Peter R. Spadaro; J. Wilson Stout, both of Pittsburgh, all of Pa.

[73] Assignee: The United States of America as represented by the United States Energy Research and Development Administration, Washington, D.C.

[22] Filed: Aug. 7, 1975

[21] Appl. No.: 602,707

Related U.S. Application Data

[62] Division of Ser. No. 461,474, April 16, 1974, abandoned.

[52] U.S. Cl. .............................. 176/19 R; 176/18; 73/213
[51] Int. Cl.² ........................................ G21C 17/00
[58] Field of Search ............... 176/17, 18, 19 R, 28, 176/29, 43, 60, 61; 73/213

[56] References Cited
UNITED STATES PATENTS

| | | |
|---|---|---|
| 2,760,371 | 8/1956 | Borden .................................. 73/213 |
| 3,060,111 | 10/1962 | Sherman et al. ..................... 176/18 |
| 3,549,494 | 12/1970 | Germer .............................. 176/19 R |
| 3,677,293 | 7/1972 | Furlong et al. ..................... 176/19 R |
| 3,806,408 | 4/1974 | Grant et al. ........................ 176/19 R |
| 3,830,095 | 8/1974 | Jaross ................................ 176/19 R |
| 3,873,419 | 4/1975 | Sletten ................................... 176/61 |
| 3,878,870 | 4/1975 | Aetherton et al. ...................... 176/43 |

FOREIGN PATENTS OR APPLICATIONS

| | | | |
|---|---|---|---|
| 1,054,605 | 4/1959 | Germany .......................... 176/19 R |

*Primary Examiner*—Stephen C. Bentley
*Assistant Examiner*—S. A. Cangialosi
*Attorney, Agent, or Firm*—Dean E. Carlson; Kenneth L. Cage; Stephen D. Hamel

[57] ABSTRACT

This invention is a fluid flow measuring device for determining the coolant flow at the entrance to a specific nuclear reactor fuel region. The device comprises a plurality of venturis having the upstream inlet and throat pressure of each respectively manifolded together to provide one static pressure signal for each region monitored. The device provides accurate flow measurement with low pressure losses and uniform entrance and discharge flow distribution.

1 Claim, 7 Drawing Figures

▲ SEED OUTLET T/C LOCATION (21)   △ SEED INLET T/C LOCATION (7)
■ BLANKET OUTLET T/C LOCATION (12)   ▫▫ BLANKET FLOWMETER LOCATION (6)
● FLUX THIMBLE LOCATION (8)   ∘∘ SEED FLOWMETER LOCATION (10)

METHOD AND DEVICE FOR MEASURING FLUID FLOW

This is a division of application Ser. No. 461,474, filed Apr. 16, 1974, now abandoned.

BACKGROUND OF THE INVENTION

The invention described herein was made in the course of, or under, a contract with the U.S. Atomic Energy Commission.

1. Field of the Invention

This invention relates to fluid flow measuring devices, and more particularly to a device for measuring the flow of coolant entering the fuel bundles located in the core of a nuclear reactor.

2. Description of the Prior Art

The measurement of flow through fluid passages and particularly individual fuel subassemblies is of interest to reactor designers, operators, and safety review bodies for a variety of reasons, including establishing a maximum allowable power level, early determination of fuel assembly blockage due to crud deposits or obstructions, experimental design analysis and determination of other reactor parameters as stability and fuel temperatures. Passage as hereinafter used is defined as a path, channel, or course by which fluid passes. A problem associated with venturis and other devices as flowmeters is obtaining reliable differential pressure measurements. There must be either a suitable in-core differential pressure transducer to transmit a signal to a read-out device or long runs of tubing between the flowmeter and a differential pressure transducer located outside the reactor vessel.

The limitations of currently available pressure and differential pressure transducers for in-core applications is well documented in Chapter 4 of "Nuclear Reactor Instrumentation (in-core)" by James F. Boland, Argonne National Laboratory, ANS-USAEC Monograph Series on Nuclear Science and Technology, Gordan and Breach Science Publishers (1970).

The problems associated with long lines between flowmeters and differential pressure transducers include heat differentials, vapor or gas pockets in the lines, boiling or freezing fluids in the lines, poor time response and fluid temperature gradients. In addition, reactor applications have the additional plumbing problems of mechanical interference with fuel handling systems and high integrity seals where connecting lines exit from the reactor vessel. A large plurality of pressure differential lines magnifies the scope and impact of the above problems. Furthermore, reactor designers have long needed an accurate, reliable flowmeter for irregular shaped flow passages to determine precisely the flow rate within the passage which can change drastically as a function of changes in total reactor flow rate, viscosity, friction factors, flow patterns, heat generation rates, and mode of reactor loop operation.

The prior art shows various types of pressure differential flow measuring devices applicable to numerous types of uses. In "Shippingport Pressurized Water Reactor" presented at that second International Conference on the Peaceful Uses of Atomic Energy, Geneva 1958, the flow of coolant within square fuel assemblies of the Shippingport Pressurized Water Reactor was measured by modified venturis and flow nozzles located in fuel assembly support adapters. A disadvantage of this system in addition to those previously enumerated was the only 16 of 32 seed regions and 20 of 113 blanket regions were instrumented due to space limitations and fuel handling operations. Although representative positions were selected for instrumentation, the danger of loss of coolant flow in an uninstrumented fuel assembly remained a serious hazard. In addition, the flow nozzles resulted in higher pressure losses than venturi meters which measured coolant flow in the respective fuel channels.

U.S. Pat. No. 3,060,111 issued to J. Sherman et al on Oct. 23, 1962, alleviated some of the above problems in the Shippingport Reactor by instrumenting each individual seed and blanket assembly with a venturi flowmeter within the fuel assembly support structure. However, the solution resulted in the installation of 194 flow measuring tubes extending from the core, along and through the pressure vessel to recording instruments. This number of pressure lines required much precision bending and fabrication. More advanced Shippingport Reactor type concepts having fuel element cross sections other than square, such as U.S. Pat. Nos. 3,219,535 and 3,154,471 issued to T. R. Robbins and A. Radkowsky on Nov. 23, 1965 and Oct. 27, 1964 respectively, make little, if any, mention of the in-core coolant flow measurement instrumentation.

A further example of having individual venturis located at the entrance of each fuel assembly is U.S. Pat. No. 3,549,494 issued to J. H. Germer on Dec. 22, 1970. Again, precision tube fabrication and bending is required in order to implement the subject matter of the Germer invention.

Thus, it became apparent that the prior art flow measuring devices have been hampered by inaccurate measurement and pressure losses or required precision fabrication and bending of a large number of tubes. The problems inherent in pressure differential flow measuring devices remained unsolved and were further magnified by having a large number of pressure lines.

Thus, a need exists for a fluid flow measuring device having accurate flow measurement with low pressure losses that is simple and easy to install and maintain.

SUMMARY OF THE INVENTION

Therefore, it is a primary object of this invention to provide a method and device to measure fluid flow in a passage.

A further object of the invention is to provide an accurate method and device for measuring fluid flow within an irregular fluid passage.

A still further object of the invention is to provide an accurate method and device for measuring coolant flow in the core of a nuclear reactor.

Another object of the invention is to provide a flow measuring device to minimize pressure losses within the reactor core caused by the device without adversely affecting the core thermal capability.

Another object of the invention is to provide a flow measuring device relatively insensitive to flow maldistribution and crud buildup.

Another object of the invention is to provide a flow measuring method and device insensitive to flowmeter pressure drop, flow distribution and calibration resulting from changes in elevation of the movable fuel assemblies within the reactor core.

Another object of the invention is to provide a flow measuring method having a smooth reliable experimentally determined calibration curve of differential pressure signal as a function of weight flow rate.

Another object of the invention is to provide a flow measuring device to minimize the number of instrumentation tubes passing through the reactor pressure vessel.

The present invention is directed to a device measuring fluid flow rate in a closed region, and more particularly the method and structure for measuring the coolant flow rate in a specified nuclear reactor region and hereinafter referred to as a flowmeter. The flowmeter of each region has parallel venturis with the entrance and throat pressure of each venturi manifolded to provide one differential static pressure signal. For the region monitored, the flowmeter provides accurate flow measurement, low pressure losses and uniform entrance and discharge flow distribution, while requiring a minimum number of pressure lines extending from the reactor vessel.

DESCRIPTION OF THE PREFERRED EMBODIMENT

The inventive flowmeter can best be understood by reference to Figures described above which specifically show its illustration in a nuclear reactor. Reference is made to the above-cited art for the particular nomenclature used in conjunction with reactors and particularly the Sherman et al patent for seed-blanket nomenclature. It should be apparent the inventive flowmeter is not limited in application to nuclear reactors but is particularly well suited for general use in any fluid flow measuring application in a passage where the objects listed above are of prime consideration in selecting a flow measuring device. Typical fluids, the flow rate of which may be measured in the inventive flowmeter includes light water, heavy water, liquid sodium, liquid potassium, helium, steam and other liquid compounds and elements, gases, liquid metals and organics. In addition, it should be noted although generally hexagonal fluid passages are illustrated, the invention is readily adaptable to other geometries, and particularly irregular fluid passages.

Figure 1:
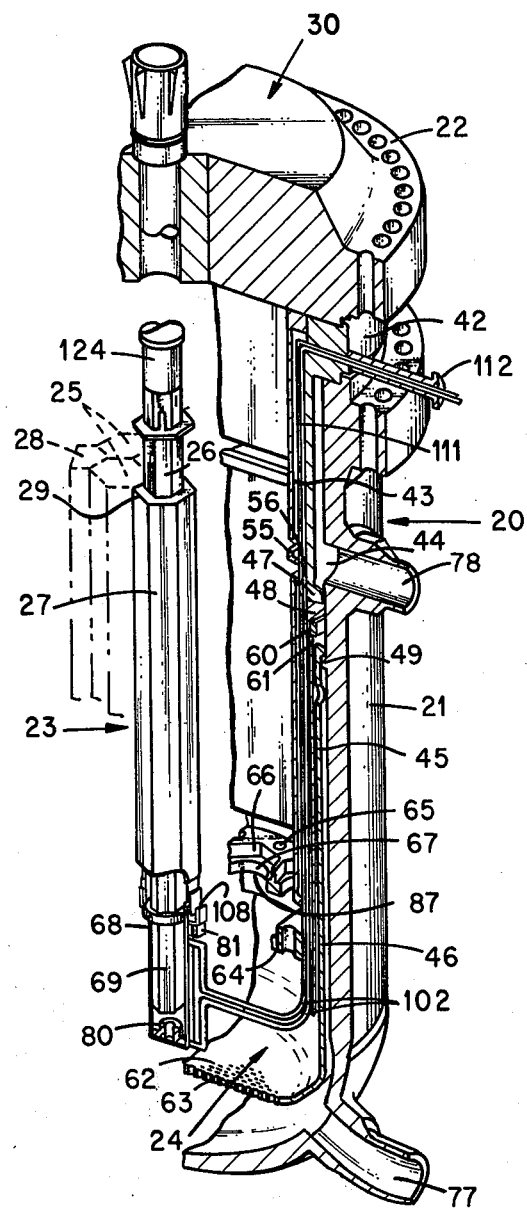
FIG. 1 is a partial vertical cross section of a perspective view of the nuclear reactor having fuel assembly regions incorporating a seed flowmeter and Type 1 blanket flowmeter.
Figure 2:
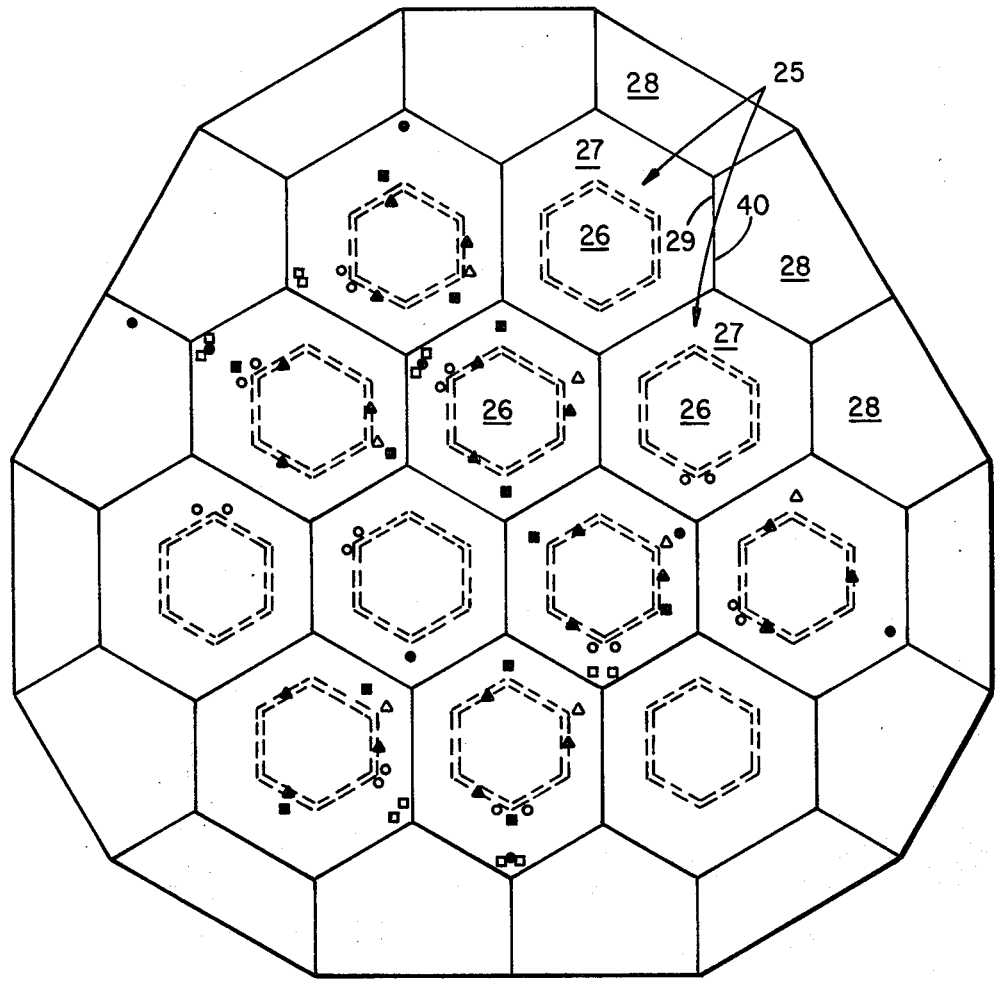
FIG. 2 is a horizontal cross sectional view of FIG. 1.

As shown in FIG. 1 and 2 a reactor 30 having fuel assemblies with coolant channels therein, incorporating the flowmeter of the present invention, comprises a pressure vessel 20, including a vessel shell 21 and a closure head 22, a core 23 contained in vessel shell 21 and a lower plenum chamber 24 in the bottom of vessel shell 21. The reactor core 23 contains hexagonal-shaped fuel modules 25 comprising hexagonal shaped seed fuel assemblies 26 disposed generally within the fuel module center, and generally hexagonal shaped blanket fuel assemblies 27 disposed around the seed assemblies 26 and a plurality of reflector assemblies 28 surrounding the periphery of the grouped fuel modules 25.

As shown in FIG. 2, the hexagonal fuel modules 25 have each side 29 arranged in a juxtapositioned relationship with a side 29 adjacent fuel modules 25 or a side 40 of a reflector assemblies 28. The seed assemblies 26 are moved longitudinally with respect to the blanket assemblies 27 by control mechanisms. The blanket assemblies 27 are supported by a plurality of blanket support tubes 124 which are suspended from the closure head 22. The seed assemblies 26 are supported by the control mechanisms which move these seed assemblies 26 longitudinally. The reflector assemblies 28 are supported by a seal ring 55, which, in turn is supported by a ledge 56 internal to an upper core barrel 44 having a flange 47 resting on the upper flange 48 of a lower core barrel 46 which rests on a Belleville spring 60 which is held in place by seal ring 61 and supported by the inlet baffle shield barrel 45 which is supported by an internal ledge 49 of the pressure vessel shell 21. The upward hydraulic forces on the reflector assemblies 28 caused by the water flowing through the reflector assemblies 28 are resisted by the holddown barrel 43 which transmits the hydraulic forces to the closure head 22. A flow baffle 62 having a plurality of openings 63 therein is formed as an internal part of the inlet baffle shield barrel 45.

A bottom plate assembly 64 affixed to the lower core barrel 46 has plurality of openings 65 around its periphery to receive stub tubes (not shown) of reflector assemblies 28. A plurality of generally hexagonal indentations 66 extend partially through the assembly 64 in accordance with the fuel module pattern shown in FIG. 2. Round openings 67 are centrally located within hexagonal indentations 66 through the bottom plate assembly 64.

The hexagonal indentations 66 receive the lower end of the blanket assemblies 27 of the fuel modules 25 and openings 67 receive a round extension 68 of seed assembly 26. A hexagonal seed coolant guide tube 69 connects to the round seed extension 68 and extends downwardly from the bottom plate assembly 64. A seed flowmeter 80 is positioned within and interlocked to the round extension 68. Blanket flowmeters 81 are aligned with the blanket assemblies 27 and are bolted to the lower face 87 of the bottom plate assembly 64. Instrumentation lines 102 are enclosed within conduit 111 and extend to a flow instrumentation nozzle 112.

The pressure vessel shell 21 is provided with four inlet nozzles 77 uniformly spaced thereabout and communicating with the lower plenum chamber. The coolant flow is supplied by four pumps (not shown) which circulate coolant through the pressure vessel 20, exiting through four outlet nozzles 78 (not uniformly spaced) and through four separate loops (not shown) each of which contains a pump (not shown) and a heat exchanger (not shown).

Figure 3:
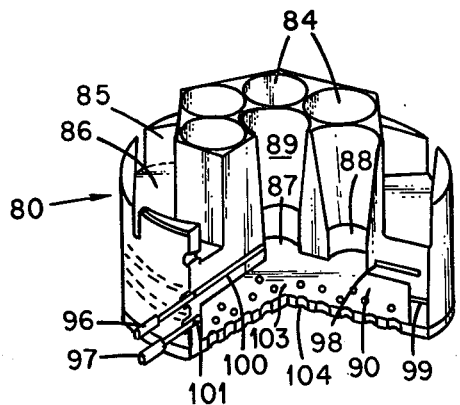
FIG. 3 is an enlarged partial perspective view of the seed flowmeter shown in FIG. 1.

In more detail, referring now to FIG. 3, the seed flowmeter 80 has a short generally cylindrical-shaped body having seven modified venturis 84 in parallel centrally located in a generally protruding hexagonal portion 85. Six venturis 84 surround a seventh centrally located venturi 84 around the periphery of the hexagonal extended portion 85. A hexagonal indentation 86 is formed within the face having the extended venturis 84 to receive the hexagonal-shaped seed coolant section 69.

As shown in FIG. 3, each of the seven parallel venturis 84 has a rounded inlet 87, throat 88, and divergent section 89. The pressures of the upstream venturi entrance 90 and throat 88 of each of the seven venturis 84 have pressure taps 100 and 101 commonly manifolded by passageways 98 and 99 to provide a low and high static pressure signal to pressure connections 96 and 97 respectively, which are connected to instrumentation lines 102 attachment shown in FIG. 1. Immediately upstream and bolted (bolts not shown) to the bottom surface of seed flowmeter 80 is a combination flow straightener and strainer 103 having a plurality of holes 104 with rounded edges at the entrance. Typical dimensions of the straightener and strainer 103 are a 0.38 inch thick plate with 0.25 inch diameter holes. An advantage of this seed flowmeter 80 is that a 6.0 psi signal is obtained with a calculated net unrecoverable loss of only 2.4 psi including the approximately one psi unrecoverable pressure loss from the strainer and straightener 103. This contributes to a net gain in core thermal capability over conventional flowmetering devices and also results in a decreased downward load on the control mechanism.

The parallel venturis 84 are less sensitive to crud because crud buildup that may occur in the strainer and straightener 103 does not effect the flowmeter calibration as it would with closely spaced plates of a conventional orifice plate design. The seed flowmeters 80 are installed in all twelve seed assemblies 26, but only 10 out of the 12 flowmeters 80 are instrumented as shown in FIG. 2. The design of the noninstrumented seed flowmeter is simplified by the elimination of pressure tap holes, manifold slots and instrumentation lines associated with the pressure signal path.

The TABLE illustrates a typical flowmeter installation arrangement and specifies the reactor core region, title and number of flowmeters, instrumentation, the number of parallel venturis per flowmeter, the number of parallel venturis instrumented per flowmeter, and the number of static pressure taps per flowmeter. Referring to the TABLE, the pressure taps 100 of seven venturis 84 within a single instrumented seed flowmeter are manifolded to provide one low-pressure signal. As noted in the last column of the TABLE, six static pressure taps 101 FIG. 3 at the entrance to the flowmeter 80 are also manifolded to provide one high pressure signal. Thus, only two instrumentation lines 102, FIG. 1, are attached to each instrumented seed flowmeter 80 at connections 96 and 97 as indicated in FIG. 3.

Figure 4:
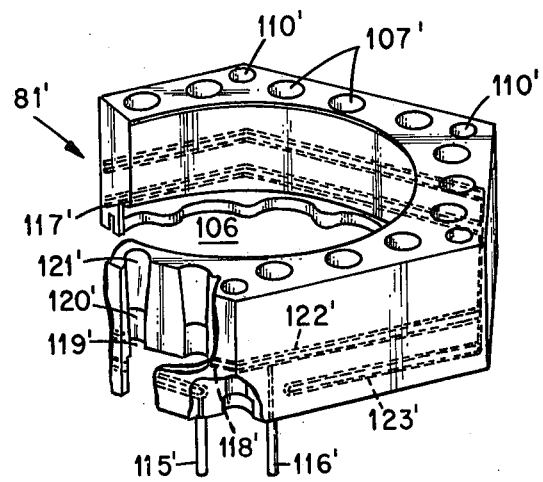
FIG. 4 is an enlarged partial perspective view of a type 1 blanket flowmeter shown in FIG. 1.

Referring now to FIG. 4 the blanket flowmeters 81' are generally hexagonal-shaped and have a large centrally located opening 106' therein with a plurality of parallel venturis 107' located circumferentially therearound. The opening 106' allows the guide tube extension 69, FIG. 1, to pass therethrough the lower face 87 of bottom plate assembly 64. As shown in FIG. 2 and identified in the TABLE there are type 1, type 2, and type 3 blanket flowmeters to fit the various generally hexagonal shapes of blanket assemblies which are instrumented and noninstrumented.

The centrally located type 1 blanket flowmeter 81' as shown in FIG. 4 has 18 parallel venturis 107' which are aligned with matching openings 108, FIG. 1, in the bottom plate assembly 64 and openings 110' for bolts (not shown) to attach the flowmeter 81' to assembly 64. Each of the eighteen modified venturis in parallel has a rounded inlet 119', a throat 120', and a divergent section 121'. The throat 120' static pressure taps 118' of the 18 venturis 107' are commonly manifolded by passageway 122' to provide one low static pressure signal. The high static pressure signal upstream of inlet 119' of flowmeter 81' is measured by the eighteen static pressure taps 117' which are manifolded by passageway 123' to provide one high static pressure signal. Pressure connectors 115' and 116' are attached to passageways 123' and 122' respectively to provide for instrumentation lines 102 connection. As noted in the TABLE, one of the three type 1 blanket flowmeters is simplified by the elimination of pressure tap holes, manifold slots and instrumentation lines associated with the pressure signal path.

Figure 5:
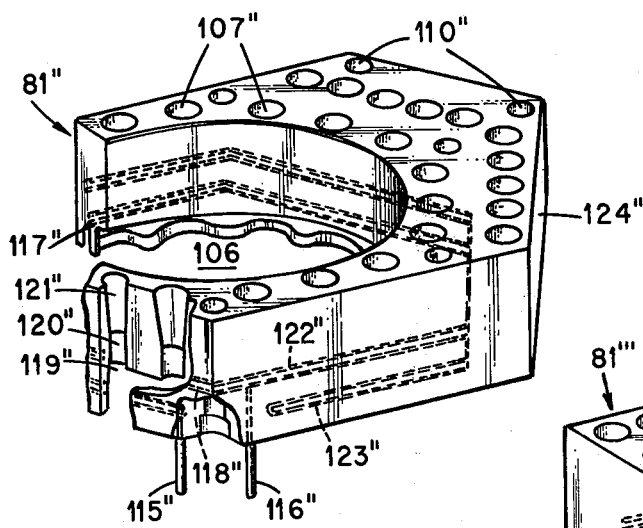
FIG. 5 is an enlarged partial perspective view of a type 2 blanket flowmeter.

Referring to FIG. 5 and the TABLE, the type 2 blanket flowmeter 81'' has 29 parallel venturis 107'' which are aligned with matching openings 108, FIG. 1, in the bottom plate assembly 64 and openings 110'' for bolts (not shown) to attach flowmeter 81'' to assembly 64. Each of the 29 venturis 107'' in parallel has a rounded inlet 119'', a throat 120'' and a divergent section 121''. Nineteen venturis 107'' are arranged in a ring encircling opening 106''; an additional, partial ring of 10 venturis 107'' is provided in extended flats 124''. The extended flats of the blanket assemblies in the power flattened region is described in U.S. Pat. No. 3,364,084 issued to Richard C. Shank et al on Feb. 8, 1972. The throat 120'' static pressure taps 118'' of the 22 instrumented venturis 107'' around the periphery of the flowmeter 81'' are manifolded by passage 122'' to provide one low static pressure signal. The high static pressure upstream of inlet 119'' of the flowmeter 81'' is measured by 21 static pressure taps 117'' which are commonly manifolded by passageway 123'' to provide one pressure signal. Pressure connectors 115'' and 116'' are attached to passageways 123'' and 122'' respectively, to provide for instrumentation lines 102 connection. As noted in FIG. 2 and the TABLE, two of the three type 2 flowmeters are instrumented. The design of the noninstrumented type 2 flowmeters is simplified by eliminating the pressure tap holes, manifold slots, and instrumentation lines associated therewith.

Figure 6:
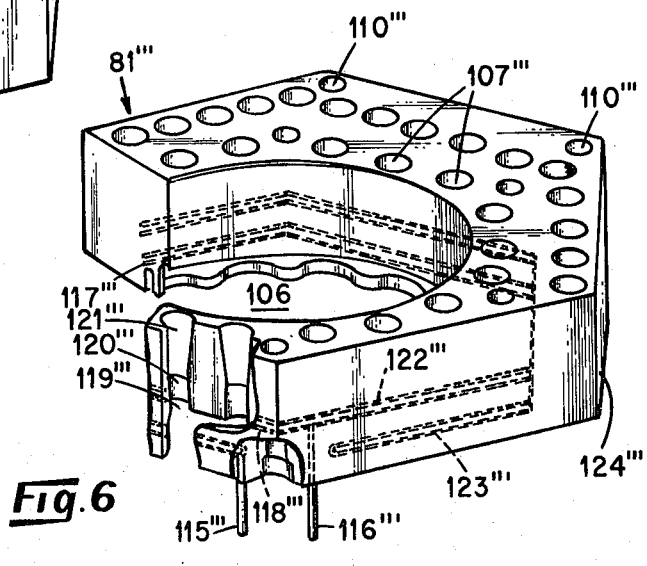
FIG. 6 is an enlarged partial perspective view of a type 3 blanket flowmeter.

Referring to FIG. 6 and the TABLE, the type 3 blanket flowmeter 81''' has 34 parallel venturis 107''' which are aligned with matched openings 108 in the bottom plate assembly 64. Each of the 34 parallel venturis has a rounded inlet 119''', a throat 120''', and a divergent section 121'''. Nineteen venturis 107''' are arranged in a ring encircling opening 106'''. An additional partial ring of 15 venturis 107''' is provided in the extended flats 124'' of the generally hexagonal shaped blanket assembly 25 and a more compact spacing is used to accommodate the higher flow rate in the power flattened region as described in the above-cited Shank et al Patent. The throat 120''' static pressure taps 118''' of the 24 venturis around the periphery of the flowmeter are manifolded by passageway 122''' to provide one low static pressure signal. The high static pressure upstream at inlet 119''' of flowmeter 81''' is measured by twenty-three pressure taps 117''' which are manifolded to provide one static pressure signal. Pressure connectors 115''' and 116''' are attached to passageways 123''' and 122''' respectively to provide for instrumentation lines 102 connection. As noted in FIG. 2 and the TABLE, two of the six type 3 flowmeters are instrumented. As in the previous types, the design of the noninstrumented type 3 flowmeters is simplified by eliminating pressure tap holes, manifold slots, and instrumentation lines associated therewith.

To summarize, blanket flowmeters 81 are installed in all twelve modules shown in FIG. 2 with two of three type 1, two of the three type 2, and two of the six type 3 flowmeters being instrumented. The location and number of these instrumented and noninstrumented flowmeters in the blanket region of the IWBR core is shown in FIG. 2 and identified in the TABLE.

Figure 7:
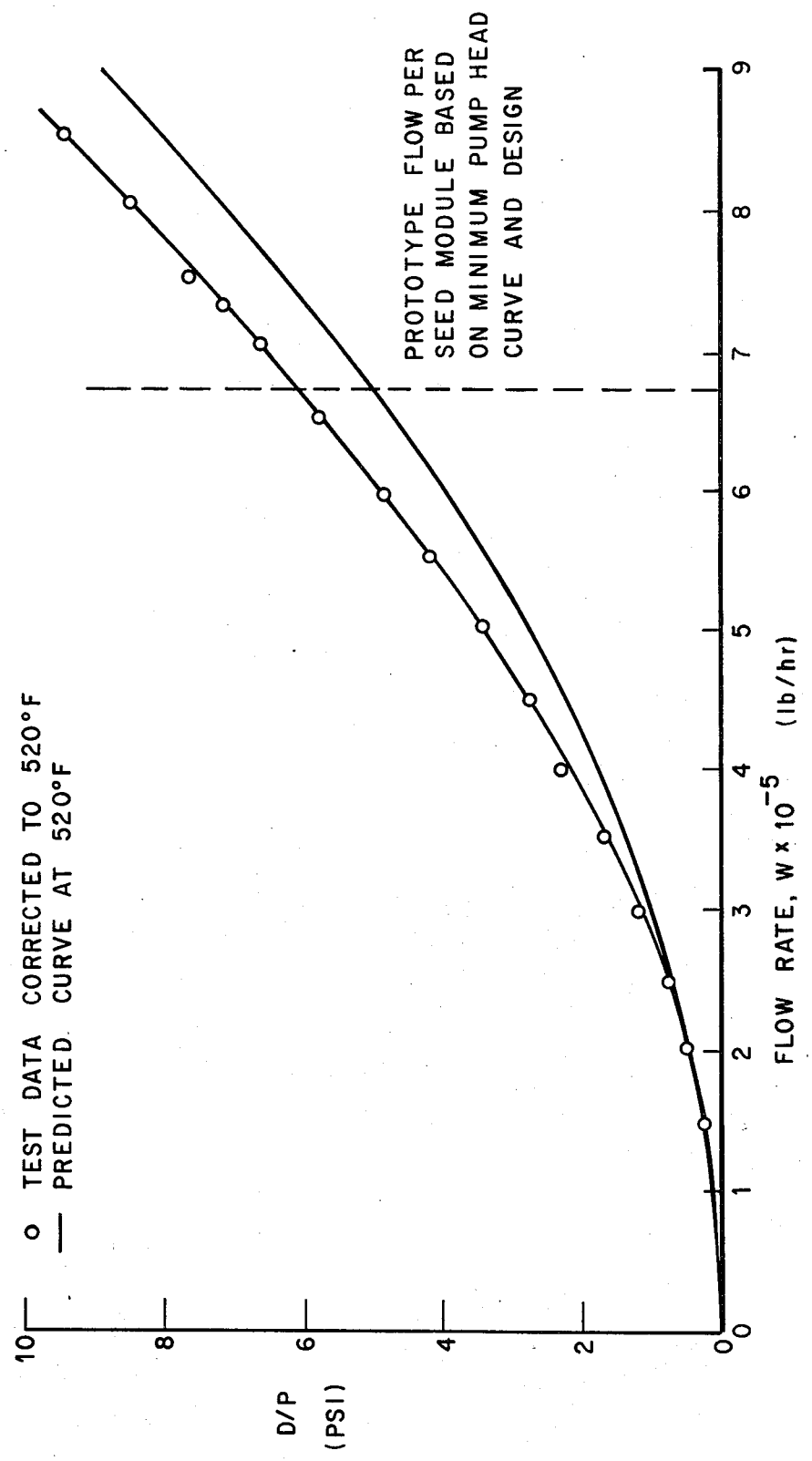
FIG. 7 is a graph showing the variation of the differential pressure of a flow measuring device with the coolant flow rate which incorporates all the features of the present invention.

The instrumentation lines 102, FIG. 1, extending from each seed and blanket flowmeter 80 and 81 are grouped and enclosed in conduit 111 which physically protects the lines during core assembly and refueling. The conduit is routed through the bottom support assembly 64, up the inside of the lower core barrel 46 and upper core barrel 44, through the core barrel support flange 42, and through a flow instrumentation nozzle 112. The lines 102 terminate at differential pressure cells (not shown) located within the containment pressure vessel. From these cells, an electrical signal whose magnitude is dependent on the differential pressure is transmitted outside the containment vessel to a control room (not shown). From the magnitude of the electrical signal together with the use of experimentally determined calibration curves (as shown in FIG. 7), the total flow rate through each instrumented seed or blanket flowmeter may be determined throughout the lifetime of the core. Although differential pressure cells and an experimental calibration curve as illustrated are used, other combinations as a calibrated pressure manometer or calibrated volt meter device can readily yield the flow rate from the pressure signals.

The novel features of the present invention can best be understood by reference to the following example.

TABLE

LIST OF FLOWMETER DESIGNS WITH IDENTIFICATION OF NUMBER OF PARALLEL VENTURIS INSTRUMENTED

| Reactor Core Region | Title of Flowmeter | No. of Flowmeters Required | Instrumented | No. of Parallel Venturis per Flowmeter | No. of Parallel Venturis instrumented per Flowmeter | No. of Static Pressure Taps Entrance to Flowmeter per Flowmeter |
|---|---|---|---|---|---|---|
| Seed | LWBR Instrumented Seed Assembly | 10 | Yes | 7 | 7 | 6 |
| Seed | LWBR Noninstrumented Seed Assembly | 2 | No | 7 | None | None |
| Blanket (Type 1) | LWBR Type 1 Instrumented Blanket Assembly | 2 | Yes | 18 | 18 | 18 |
| Blanket (Type 1) | LWBR Type 1 Noninstrumented Blanket Housing and Details | 1 | No | 18 | None | None |
| Blanket (Type 2) | LWBR Type 2 Blanket Details and Assembly | 2 | Yes | 29 | 22 | 21 |
| Blanket (Type 2) | LWBR Type 2 Blanket Details and Assembly | 1 | No | 29 | None | None |
| Blanket (Type 3) | LWBR Type 3 Blanket Details and Assembly | 2 | Yes | 34 | 24 | 23 |
| Blanket (Type 3) | LWBR Type 3 Blanket Details and Assembly | 4 | No | 34 | None | None |

EXAMPLE

A prototype seed flowmeter was fabricated and tested in a full scale water flow visualization model. From these data, a flow calibration curve of pressure differential versus flow rate was determined and is presented in FIG. 7 along with the predicted curve. The test curve shows that measured pressure signal was slightly greater than the predicted pressure signal and increased in magnitude as the flow rate increased. The test results also show that the seed flowmeter functioned with good stability and accuracy when subject to artificially induced gross upstream flow maldistribution.

Thus has been described a flowmeter and application thereof accomplishing the above-listed objects of the invention. The compact flowmeter design permits installation under far from ideal hydraulic conditions and still achieves accurate flow measurements, good flow distribution, low unrecoverable pressure loss, and high pressure output signal. The use of parallel venturis to measure fuel module flow rates provides accurate results having only instrumentation measurement of one pressure differential per instrumented flowmeter.

In addition, it is readily apparent to one skilled in the nuclear art, the invention is readily adapted for use in gas cooled nuclear reactors and those employing other fluidic coolants. Furthermore, as illustrated by the type 2 and type 3 blanket flowmeters, the invention is readily adapted to fluid passages having a wide variety of irregular geometric cross sections.

It will be understood that the invention is not limited to details given herein or specific examples illustrated but that it may be modified with the scope of the appended claims.

We claim:

1. In a nuclear reactor core comprising a grouped plurality of fuel modules, each fuel module including a hexagonal-shaped seed fuel assembly having a bottom coolant inlet end centrally disposed within the fuel module and an annular, hexagonal-shaped blanket fuel assembly having a bottom coolant inlet end disposed about the seed fuel assembly whereby coolant enters said seed and blanket fuel assemblies through their respective bottom coolant inlet ends and passes upward through said assemblies; the improvement comprising fuel module flow meters disposed at the bottom ends of said fuel modules; each of said flowmeters including:
 1. a seed fuel assembly flowmeter portion comprising:
  a. a generally cylindrical body defining:
   i. a plurality of first axially-extending venturis, each of said first venturis having a rounded inlet, a throat and a divergent section;
   ii. a plurality of first pressure taps opening immediately upstream of the inlet to said first venturis, said first pressure taps being commonly manifolded to a first single outlet; and
   iii. a plurality of second pressure taps opening within the throat sections of said first venturis, said second pressure taps being commonly manifolded to a second single outlet;
  b. means connected to said first and second outlets for determining the pressure differential therebetween;
  c. means relating the differential pressure between said first and second outlets to the rate of coolant flow through said seed fuel assembly flowmeter portion;
 2. a blanket fuel assembly flowmeter portion comprising:
  a. an annular body defining:
   i. a plurality of second axially extending venturis, each of said second venturis having a rounded inlet, a throat and a divergent section;
   ii. a plurality of third pressure taps opening immediately upstream of the inlets to said second venturis, said third pressure taps being commonly manifolded into a third single outlet;
   iii. a plurality of fourth pressure taps opening within the throat sections of said second venturis, said fourth pressure taps being commonly manifolded to a fourth single outlet;
  b. means connected to said third and fourth outlets for determining the pressure differential therebetween; and
  c. means relating the pressure differential between said third and fourth outlets to the rate of current flow through said blanket fuel assembly flowmeter portion.

* * * * *